United States Patent
Zhou

(10) Patent No.: US 11,075,449 B2
(45) Date of Patent: Jul. 27, 2021

(54) ELECTRONIC DEVICE WITH ANTENNA MECHANISM

(71) Applicant: GUANGDONG OPPO MOBILE TELECOMMUNICATIONS CORP., LTD., Guangdong (CN)

(72) Inventor: Lin Zhou, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 88 days.

(21) Appl. No.: 16/550,830

(22) Filed: Aug. 26, 2019

(65) Prior Publication Data
US 2020/0076065 A1 Mar. 5, 2020

(30) Foreign Application Priority Data

Aug. 29, 2018 (CN) .......................... 201810998311.X
Aug. 29, 2018 (CN) .......................... 201821410392.9

(51) Int. Cl.
| *H01Q 1/22* | (2006.01) |
| *H01Q 1/24* | (2006.01) |
| *H01Q 1/42* | (2006.01) |
| *H01Q 1/44* | (2006.01) |
| *H01Q 1/27* | (2006.01) |

(52) U.S. Cl.
CPC ............ *H01Q 1/27* (2013.01); *H01Q 1/2258* (2013.01); *H01Q 1/242* (2013.01); *H01Q 1/42* (2013.01); *H01Q 1/44* (2013.01)

(58) Field of Classification Search
CPC .......... H01Q 1/24; H01Q 1/242; H01Q 1/243; H01Q 1/27; H01Q 1/2258; H01Q 25/00; H01Q 1/44; H04M 1/0214; H04M 1/0268; G06F 1/1616; G06F 1/1622
See application file for complete search history.

(56) References Cited

U.S. PATENT DOCUMENTS 9,136,590 B2 * 9/2015 Hotta ....................... H01Q 9/42
10,148,304 B2 * 12/2018 Chang ................. H04W 52/367
(Continued)

FOREIGN PATENT DOCUMENTS

| CN | 1783740 A | 6/2006 |
| CN | 106058429 A | 10/2016 |

(Continued)

OTHER PUBLICATIONS

Search Report for the corresponding EP patent application No. 19193340.7, dated Jan. 9, 2020.
(Continued)

*Primary Examiner* — Thai Pham
(74) *Attorney, Agent, or Firm* — Perkins Coie LLP

(57) ABSTRACT

The present disclosure provides an electronic device that includes a first housing, a second housing, a rotary shaft, a display screen, and at least one antenna radiator. The second housing is rotatably coupled to the first housing by the rotary shaft. The display screen comprises a first portion and a second portion. The first portion is positioned on the first housing, and the second portion is positioned on the second housing. The at least one antenna radiator is positioned on the rotary shaft and configured to transmit radio frequency signals.

19 Claims, 7 Drawing Sheets

(56) References Cited

U.S. PATENT DOCUMENTS

| | | | |
|---|---|---|---|
| 2013/0077224 A1* | 3/2013 | Mo | G06F 1/1683 |
| | | | 361/679.21 |
| 2013/0187833 A1* | 7/2013 | Kim | G06F 1/1641 |
| | | | 345/1.3 |
| 2013/0321340 A1* | 12/2013 | Seo | G06F 1/1647 |
| | | | 345/174 |
| 2014/0043745 A1 | 2/2014 | McCormack et al. | |
| 2015/0244059 A1* | 8/2015 | Onaka | H01Q 21/28 |
| | | | 343/702 |
| 2017/0220066 A1 | 8/2017 | Ohishi et al. | |
| 2018/0203658 A1* | 7/2018 | Files | G09G 5/006 |
| 2018/0348825 A1* | 12/2018 | Rittenhouse | G06F 1/1681 |

FOREIGN PATENT DOCUMENTS

| | | | |
|---|---|---|---|
| CN | 107390784 A | | 11/2017 |
| CN | 108024445 A | | 5/2018 |
| CN | 108039568 A | | 5/2018 |
| CN | 108039569 A | * | 5/2018 |
| CN | 108039569 A | | 5/2018 |
| CN | 108063305 A | | 5/2018 |
| CN | 109193115 A | | 1/2019 |
| CN | 208637579 U | | 3/2019 |
| GB | 2551212 A | | 12/2017 |
| WO | WO2016061017 A1 | | 4/2016 |

OTHER PUBLICATIONS

International search report for PCT/CN2019/102860, dated Dec. 5, 2019.

* cited by examiner

US 11,075,449 B2

ELECTRONIC DEVICE WITH ANTENNA MECHANISM

CROSS-REFERENCE TO RELATED APPLICATIONS

This application claims priority to Chinese Patent Application No. 201810998311.X, filed on Aug. 29, 2018 and Chinese Patent Application No. 201821410392.9, filed on Aug. 29, 2018, the contents of which are hereby incorporated by reference in their entireties.

FIELD

This disclosure relates to the field of communication technology, and particularly to an electronic device with antenna mechanism.

BACKGROUND

Since the development of communication technology and the improvement of intelligent level of electronic equipment, more and more functions can be achieved by users through electronic devices, such as communicating, chatting, playing games, etc. These functions are achieved by signal transmission through the antennas of electronic devices.

When communicating with base stations or other electronic devices, the electronic device needs to transmit uplink signals to external and receive downlink signals from external through antennas, so as to implement data interaction with base stations or other electronic devices. However, the requirements of the display screen of electronic devices are becoming higher, the influence on the clearance zone of the antenna is also becoming greater. The design of multiple antennas on electronic devices becomes difficult, which reduces the antenna performance of electronic devices.

SUMMARY

The present disclosure provides an electronic device to improve the antenna performance.

In a first aspect, implementations of the present disclosure provide an electronic device, the electronic device can include: a first housing, a second housing, a rotary shaft, a display screen and at least one antenna radiator; the second housing is rotatably coupled to the first housing by the rotary shaft; the display screen comprising a first portion and a second portion, the first portion is positioned on the first housing, the second portion is positioned on the second housing, the at least one antenna radiator is positioned on the rotary shaft and configured to transmit radio frequency signals.

In a second aspect, implementations of the present disclosure provide an electronic device, the electronic device can include: a first housing, a second housing, a rotary shaft and at least one antenna radiator, the first housing is coupled to the second housing by the rotary shaft; at least one antenna radiator positioned on the rotary shaft, the antenna radiator configured to transmit radio frequency signals through the rotary shaft.

In a third aspect, implementations of the present disclosure provide an antenna mechanism, the antenna mechanism can include: a rotary shaft and at least one antenna radiator, the rotary shaft is configured to provide a rotating connection between a first housing and a second housing of an electronic device, the rotary shaft is exposed externally when the first housing and the second housing are folded relative to each other; the at least one antenna radiator is positioned on the rotary shaft, the at least one antenna radiator is configured to transmit radio frequency signals through the rotary shaft.

BRIEF DESCRIPTION OF THE DRAWINGS

In order to more clearly illustrate technical solutions of embodiments of the present disclosure, the drawings required to be used in the embodiments will be briefly described below. Evidently, the drawings in the following description are some embodiments of the present disclosure, and other drawings can also be obtained by those ordinarily skilled in the art according to these drawings without any creative work.

DETAILED DESCRIPTION

Figure 1:
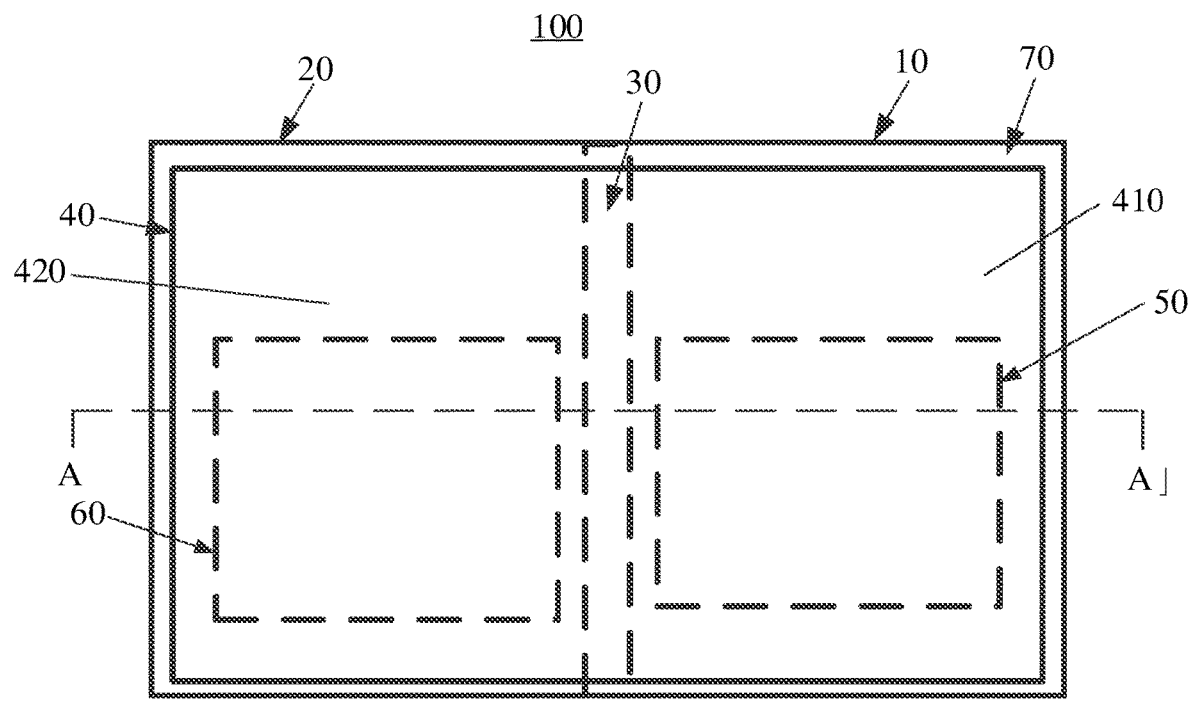
FIG. 1 is a first schematic view of an electronic device according to an embodiment of the present disclosure.

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present disclosure without creative efforts shall fall within the protection scope of the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise" should be construed to refer to the orientation as then described or as shown in the drawings under discussion. These relative terms are for convenience of description and do not require that the present invention be constructed or operated in a particular orientation.

In the present disclosure, unless specified or limited otherwise, terms "mounted", "connected", "coupled" and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

The disclosure relates to an electronic device, the electronic device can include: a first housing, a second housing, a rotary shaft, a display screen and at least one antenna radiator; the second housing is rotatably coupled to the first housing by the rotary shaft; the display screen comprising a first portion and a second portion, the first portion is positioned on the first housing, the second portion is positioned on the second housing, the at least one antenna radiator is positioned on the rotary shaft and configured to transmit radio frequency signals.

In at least one embodiment, the at least one antenna radiator can include: a first antenna radiator and a second antenna radiator; the first antenna radiator is positioned on the rotary shaft; the second antenna radiator is positioned on the rotary shaft and separated from the first antenna radiator.

In at least one embodiment, the rotary shaft can include: a first shaft portion and a second shaft portion separated from the first shaft portion; the first antenna radiator is positioned on the first shaft portion; the second antenna radiator is positioned on the second shaft portion.

In at least one embodiment, the rotary shaft can include a first end, and the at least one antenna radiator is positioned near the first end of the rotary shaft, the at least one antenna radiator extending to the first end of the rotary shaft.

In at least one embodiment, the rotary shaft is a metal shaft, the rotary shaft can include a first end and a second end opposite to the first end, a ground point is positioned on the rotary shaft and positioned between the first end and the second end so that a first part of the rotary shaft between the first end and the ground point forms a first antenna radiator of the at least one antenna radiators and a second part of the rotary shaft between the second end and the ground point forms a second antenna radiator of the at least one antenna radiators.

In at least one embodiment, the first housing can include a first connecting portion coupled to the rotary shaft, and the second housing can include a second connecting portion coupled to the rotary shaft, the first connecting portion and the second connecting portion are positioned between the first end and the second end.

In at least one embodiment, the rotary shaft can include a non-metallic rotary shaft housing, and the at least one antenna radiator is positioned inside the non-metallic rotary shaft housing.

In at least one embodiment, the first housing can include a first housing assembly, and the second housing can include a second housing assembly that is coupled to the first housing assembly by the rotary shaft housing.

In at least one embodiment, the at least one antenna radiator on the rotary shaft is configured to transmit radio frequency signals at a first frequency that is below 4200 MHz, or a second frequency that is above 4.4 GHz.

In at least one embodiment, the electronic device can further include a number of additional antenna radiators, the additional antenna radiators are positioned on the first housing, and a number of the antenna radiators positioned on the first housing and the rotary shaft is 8, 12 or 16.

In at least one embodiment, the electronic device can further include a first signal source, the first signal source is positioned inside the first housing to be electrically coupled to the at least one antenna radiator.

In at least one embodiment, the electronic device can further include a housing assembly, the housing assembly can include a rear cover, the rear cover and a portion of the display screen are respectively disposed on opposite sides of the first housing.

In at least one embodiment, the electronic device can further include a number of additional antenna radiators, the rear cover can include a non-metallic material, and the additional antenna radiators are positioned on the rear cover.

In at least one embodiment, the electronic device can further include a number of additional antenna radiators, the first housing assembly can include a middle frame, and the additional antenna radiators are positioned on the middle frame.

In at least one embodiment, the electronic device can further include a secondary display screen, the secondary display screen and the display screen are respectively disposed on opposite sides of the second housing, and the display screen is flexible.

The disclosure further relates to an electronic device, the electronic device can include: a first housing, a second housing, a rotary shaft and at least one antenna radiator, the first housing is coupled to the second housing by the rotary shaft; at least one antenna radiator is positioned on the rotary shaft and configured to transmit radio frequency signals through the rotary shaft.

In at least one embodiment, the rotary shaft is exposed externally when the first housing and the second housing are folded relative to each other, the radio frequency signals emitted by the antenna radiator are transmitted through the rotary shaft.

In at least one embodiment, the electronic device can further include: a flexible display screen, the flexible display screen is positioned on the first housing and the second housing.

In at least one embodiment, the flexible display screen is configured to fold inward when the first housing and the second housing are folded relative to each other.

The disclosure further relates to an antenna mechanism, the antenna mechanism can include: a rotary shaft and at least one antenna radiator, the rotary shaft is configured to provide a rotating connection between a first housing and a second housing of an electronic device, the rotary shaft is exposed externally when the first housing and the second housing are folded relative to each other; the at least one antenna radiator is positioned on the rotary shaft, the at least one antenna radiator is configured to transmit radio frequency signals through the rotary shaft.

The present disclosure provides an electronic device, such as a smartphone, a tablet computer, a game device, and an AR (Augmented Reality) device, an automobile, a data storage device, an audio player, a video player, a notebook computer, or a desktop computing device, with no limitation set in the embodiment of the present disclosure.

Figure 2:
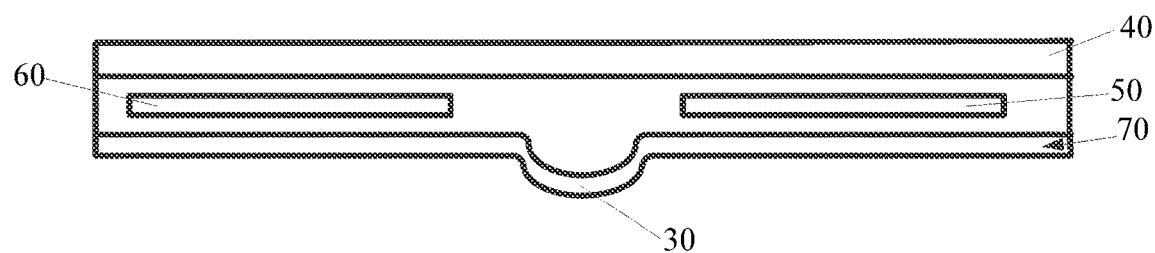
FIG. 2 is a cross-sectional view of A-A' direction in FIG. 1.

FIG. 1 and FIG. 2 illustrate that an electronic device 100 includes a first housing 10, a second housing 20, a rotary shaft 30, a display screen 40, a circuit board 50, a battery 60 and a housing assembly 70.

The display screen 40 can be a flexible display screen. The first housing 10 and the second housing 20 can be rotated relative to each other. In an embodiment, the first housing 10 can rotate around the rotary shaft 30 when the electronic device 100 is in use. In an alternative embodiment, the second housing 20 can rotate around the rotary shaft 30 when the electronic device 100 is in use. When the first housing 10 and the second housing 20 are unfolded relative to each other, the display screen 40 is unfold and positioned on the first housing 10 and the second housing 20. The display screen 40 includes a first portion 410 and a second portion 420. The first portion 410 is positioned on the first housing 10, and the second portion 420 is positioned on the second housing 20. When the first housing 10 and the second housing 20 are folded relative to each other, the display screen 40 folds inward. The first portion 410 of the display screen 40 positioned on the first housing 10 and the second portion 420 of the display screen 40 positioned on the second housing 20 are folded relative to each other.

Figure 3:
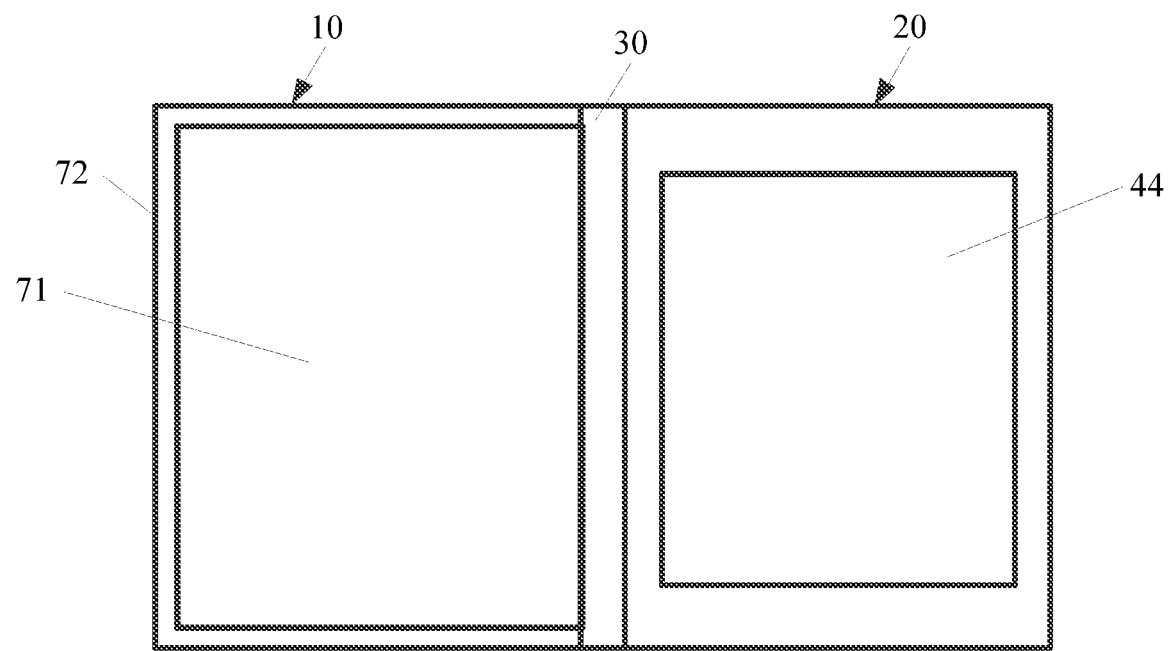
FIG. 3 is a second schematic view of an electronic device according to an embodiment of the present disclosure.

FIG. 3 illustrates opposite side of the electronic device 100 to the display screen 40. If the display screen 40 is a front side of the electronic device 100, the FIG. 3 shows a back side of the electronic device 100. The housing assembly 70 may include a rear cover 71 and other structures. The display screen 40, the circuit board 50, the rear cover 71 and the other structures are stacked on each other. The housing assembly 70 further includes a middle frame 72 surrounding the display screen 40.

In some embodiments, material of the rotary shaft 30 can be plastic or metal. The first housing 10 and the second housing 20 can be coupled to the rotary shaft 30. The circuit board 50 can be positioned in the first housing 10. The circuit board 50 and the display screen 40 can be in a stacked arrangement, e.g., the circuit board 50 can be disposed below the display screen 40.

The circuit board 50 may be a motherboard of the electronic device 100. A grounding point is provided on the circuit board 50, so as to provide grounding of the circuit board 50. A processor can be integrated on the circuit board 50. One, two or more kinds of functional components can also be integrated on the circuit board 50, such as motor, microphone, speaker, receiver, headphone jack, universal serial bus interface (USB interface), camera, distance sensor, ambient light sensor, gyroscope, etc. The display screen 40 can be coupled to the circuit board 50.

In some embodiments, the circuit board 50 has a display control circuit. The display control circuit outputs control signals to the display screen 40 to control the information displayed on the display screen 40.

In some embodiments, the battery 60 can be positioned inside the second housing 20. The battery 60 and the display screen 40 can be in a stacked arrangement, e.g., the battery 60 can be disposed below the display screen 40. The battery 60 can be electrically coupled to the circuit board 50, in order to power the electronic device 100. The circuit board 50 may has a power management circuit. The power management circuit is configured to distribute the voltage provided by the battery 60 to various electronic components of the electronic device 100.

In some embodiments, the circuit board 50 and the battery 60 both can be positioned in the first housing 10 or the second housing 20.

Figure 4:
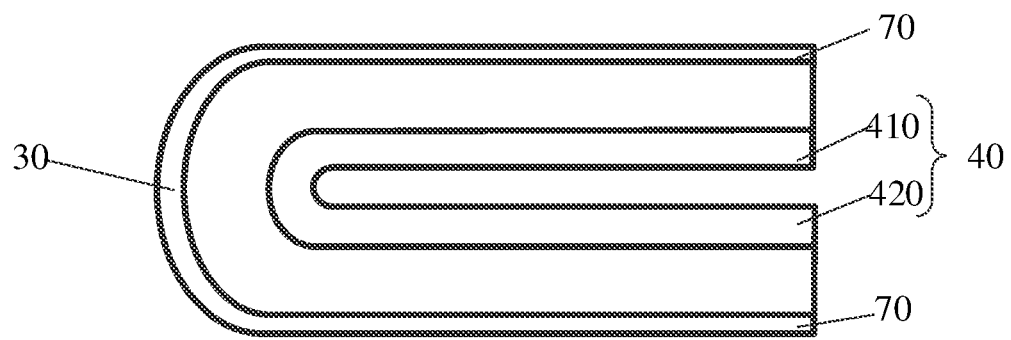
FIG. 4 is a third schematic view of an electronic device according to an embodiment of the present disclosure.

FIG. 4 illustrates that electronic device 100 is at a folded state, the first housing 10 and the second housing 20 of the electronic device 100 are folded relative to each other. The first portion 410 positioned on the first housing 10 is adjacent to the second portion 420 positioned on the second housing 20. In the illustrated embodiment, when the electronic device 10 is at a folded state, the most part of the first portion 410 is substantially parallel to most part of the second portion 420.

Figure 5:
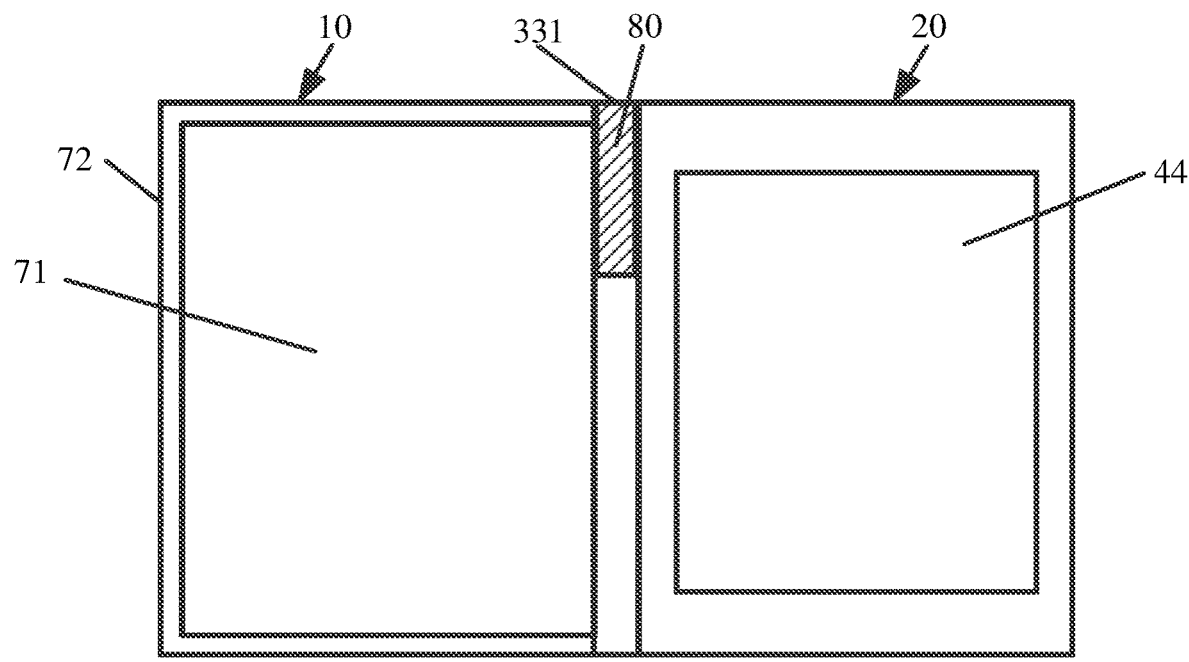
FIG. 5 is a fourth schematic view of an electronic device according to an embodiment of the present disclosure.

FIG. 5 illustrates that the first housing 10 can include the rear cover 71. The rear cover 71 and the display screen 40 are respectively disposed on opposite sides of the first housing 10. For example, the rear cover 71 and the display screen 40 are respectively disposed on the front and back of the first housing 10. Thereby, when the display screen 40 is unfolded, the display screen 40 and the rear cover 71 can be respectively used as the front and back of the first housing 10.

The rear cover 71 can be integrally formed as one piece of physical member. During the forming process of the rear cover 71, a rear camera hole, a fingerprint module mounting hole, and other structures can be defined in the rear cover 71.

In some embodiments, the electronic device 100 further includes a secondary display screen 44. The secondary display screen 44 and the display screen 40 are respectively disposed on opposite sides of the second housing 20. For example, the secondary display screen 44 and the display screen 40 are respectively disposed on the front and back of the second housing 20. Thereby, when the display screen 40 is unfolded, the display screen 40 and the secondary display screen 44 can be respectively used as the front and back of the second housing 20. When the display screen 40 is folded, the display screen 40 and the secondary display screen 44 can be respectively used as the back and front of the second housing 20.

The secondary display screen 44 can be a Liquid Crystal Display (LCD) screen or an Organic Light Emitting Diode (OLED) screen. The secondary display screen 44 can also be configured to display images, text, and other information.

For example, when the first housing 10 and the second housing 20 rotate around the rotary shaft 30 to a folded position, e.g., when the first portion 410 of the display screen 40 positioned on the first housing 10 and the second portion 420 of the display screen 40 positioned on the second housing 20 rotate to contact and/or be in proximity to each other, the secondary display screen 44 can be used as the display screen of the electronic device 100. In this embodiment, the display screen 40 can keep the screen off.

In some embodiments, the inner side of the first housing 10 and the second housing 20 can be positioned on the middle frame 72. The middle frame 72 is configured to support the electronic components inside the first housing 10 and the second housing 20.

For example, the circuit board 50 and other electronic components inside the first housing 10 can be positioned on the middle frame 72 inside the first housing 10. The battery 60 and other electronic components in the second housing 20 can be positioned on the middle frame 72 inside the second housing 20.

With continued reference to FIG. 5, in some embodiments, the electronic device 100 further includes at least one antenna radiator 80. The at least one antenna radiator 80 is positioned to the rotary shaft 30 and is configured to transmit radio frequency signals. Transmitting radio frequency signals by the at least one antenna radiator 80 may be understood as emitting and/or receiving radio frequency signals.

In some embodiments, when the first housing 10 and the second housing 20 are unfolded relative to each other, the display screen 40 is unfold and positioned on the first housing 10 and the second housing 20. The display screen 40 is configured to display content in full screen. The at least one antenna radiator 80 is positioned on the rotary shaft 30, which can achieve better antenna performance regardless whether the first housing 10 and the second housing 20 are unfolded or folded relative to each other because the better antenna performance is not affected by the first housing 10 and the second housing 20. Thus, the stability of communication between the electronic device 100 and base station or other electronic equipment can be improved.

Figure 6:
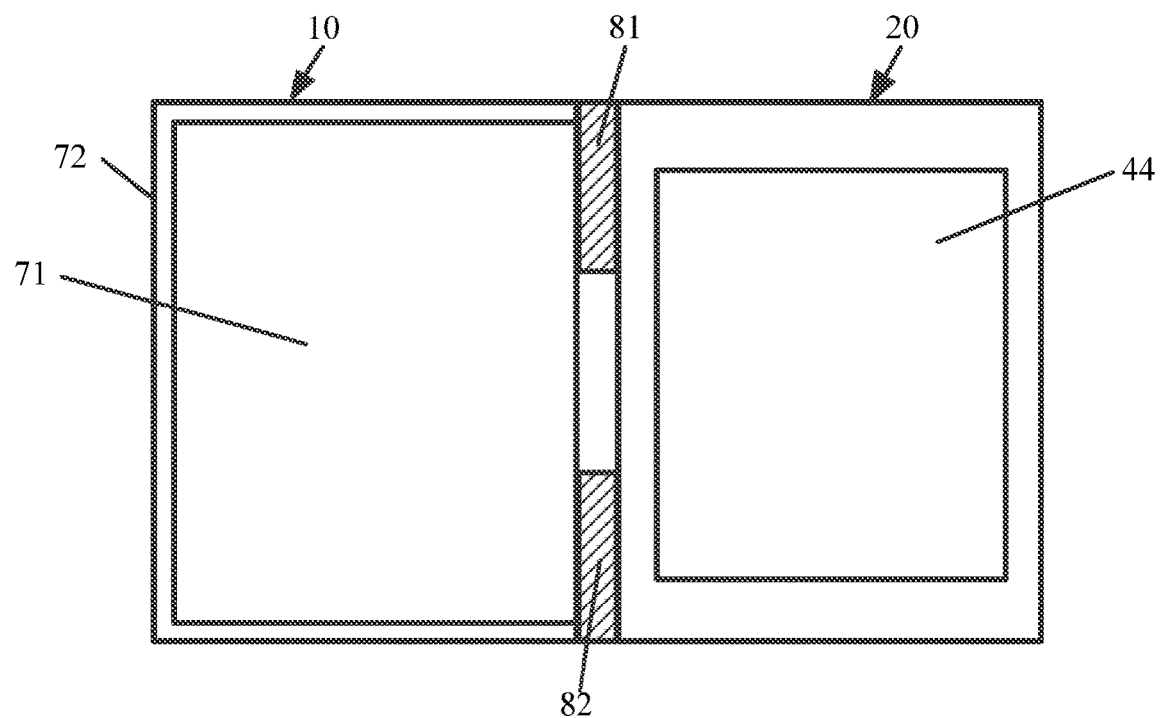
FIG. 6 is a fifth schematic view of an electronic device according to an embodiment of the present disclosure.

FIG. 6 illustrates that at least one antenna radiator 80 positioned on the rotary shaft 30 includes the first antenna radiator 81 and the second antenna radiator 82. The first antenna radiator 81 is configured to receive or emit radio frequency signals and the second antenna radiator 82 is configured to receive or emit radio frequency signals. The first antenna radiator 81 and the second antenna radiator 82 are positioned on the rotary shaft 30 to make full use of the space of the rotary shaft 30.

Figure 7:
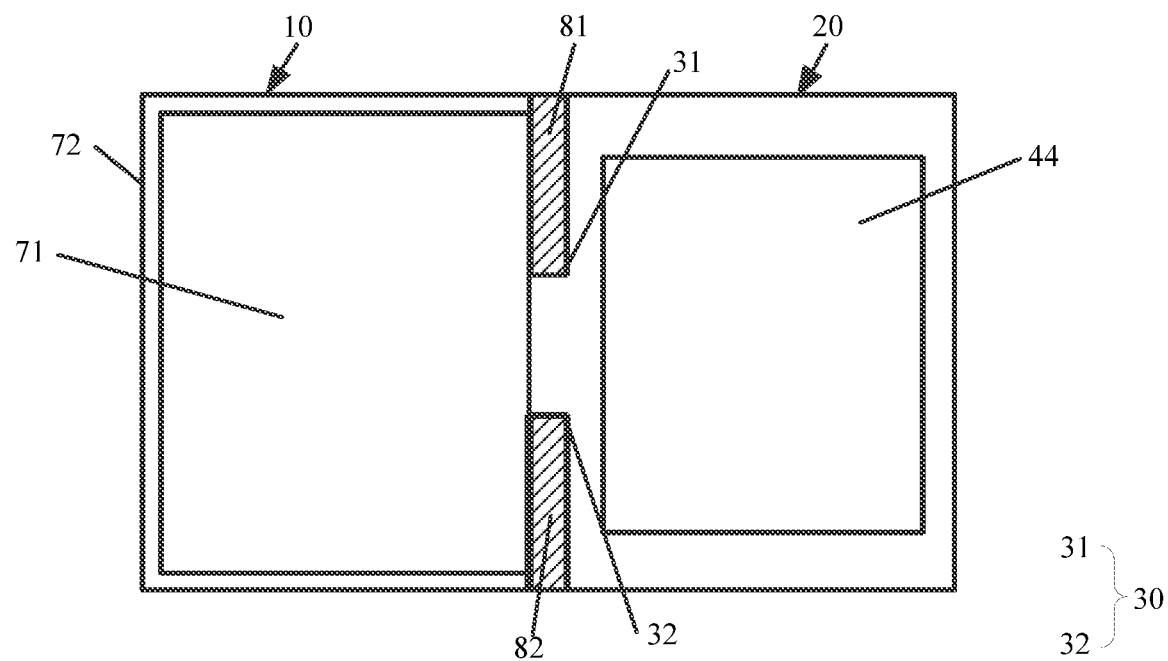
FIG. 7 is a sixth schematic view of an electronic device according to an embodiment of the present disclosure.

FIG. 7 illustrates that the rotary shaft 30 includes a first shaft portion 31 and a second shaft portion 32. The first shaft portion 31 can be separated from the second shaft portion 32. The first antenna radiator 81 is positioned on the first shaft portion 31, and the second antenna radiator 82 is positioned on the second shaft portion 32.

For example, the first shaft portion 31 is positioned at one end of the electronic device 100, and the second shaft portion 32 is positioned at the other end of the electronic device 100. The first shaft portion 31 and the second shaft portion 32 are separated by a distance. For example, the length between the two ends of the electronic device 100 is L, the distance between the first shaft portion 31 and the second shaft portion 32 can be L/3, and the length of the first shaft portion 31 and the second shaft portion 32 can also be L/3. In at least one embodiment, the length of the first shaft portion 31 and the second shaft portion 32 can be set as needed. For example, the length of the first shaft portion 31 is greater than the length of the second shaft portion 32. The first antenna radiator 81 and the second antenna radiator 82 are respectively positioned on the first shaft portion 31 and the second shaft portion 32, which can improve the isolation degree between the first antenna radiator 81 and the second antenna radiator 82.

With continued reference to FIG. 5, in some embodiments, the rotary shaft 30 includes a first end 331. The antenna radiator 80 is positioned near the first end 331, and the antenna radiator 80 extending to the first end 331 of the rotary shaft 30.

The first end 331 of the rotary shaft 30 is an endpoint of the electronic device 100. The first end 331 is exposed externally of the electronic device 100. The antenna radiator 80 is positioned near the first end 331, and the antenna radiator 80 extending to the first end 331 of the rotary shaft 30, e.g., the end of the antenna radiator 80 is exposed externally. The radio frequency signals can be transmitted to the external from the end of the antenna radiator 80. Emitting and receiving radio frequency signals are not affected by other components, thereby achieving better antenna performance of the antenna radiator 80.

Figure 8:
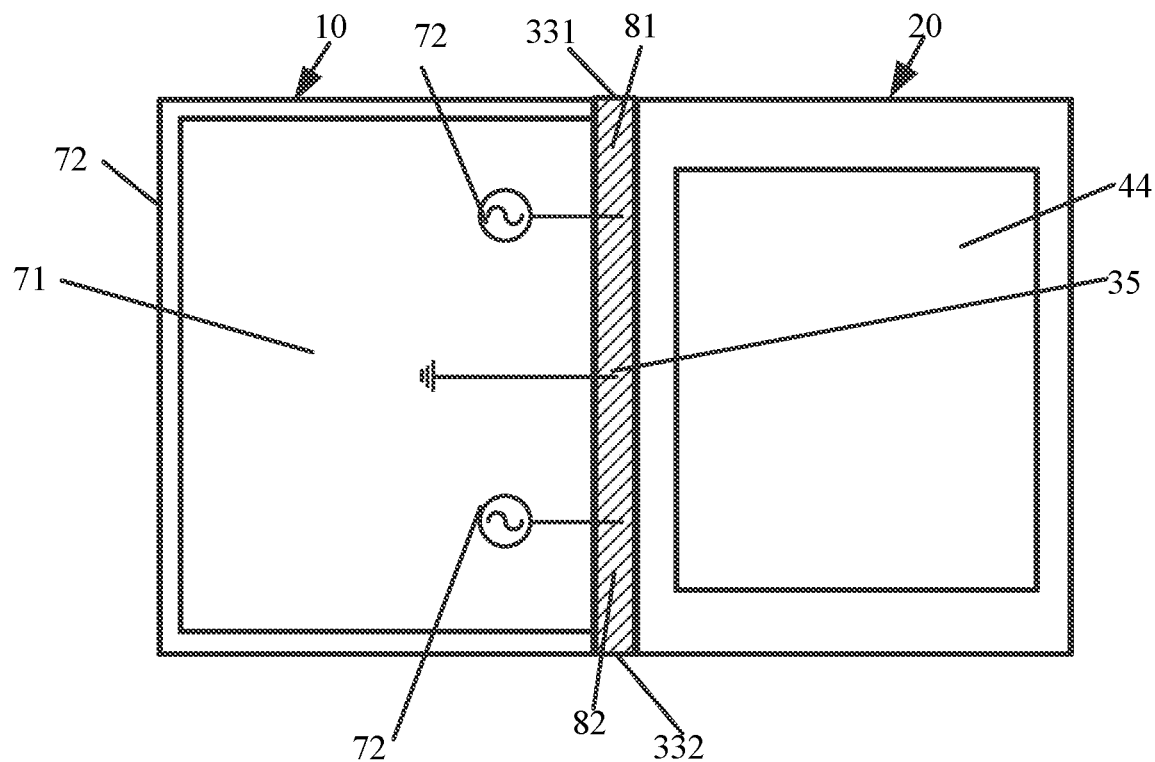
FIG. 8 is a seventh schematic view of an electronic device according to an embodiment of the present disclosure.

In some embodiments, the rotary shaft 30 is a metal shaft. FIG. 8 illustrates that the rotary shaft 30 includes a first end 331 and a second end 332 opposite to the first end 331. A ground point 35 is positioned on the rotary shaft 30. For example, the ground point 35 is positioned between the first end 331 and the second end 332. A first part of the rotary shaft 30 between the first end 331 and the ground point 35 forms the first antenna radiator 81, and a second part of the rotary shaft 30 between the second end 332 and the ground point 35 forms the second antenna radiator 82.

The rotary shaft 30 is a metal shaft, so the rotary shaft 30 can be directly used as the antenna radiator. The rotary shaft 30 can be directly used for emitting and receiving radio frequency signals. The first end 331, the ground point 35 and the second end 332 of the rotary shaft 30 are positioned successively. The first part of the rotary shaft 30 between the first end 331 and the ground point 35 forms the first antenna radiator 81, and the second part of the rotary shaft 30 between the second end 332 and the ground point 35 forms the second antenna radiator 82. The first antenna radiator 81 and the second antenna radiator 82 make full use of the length of the rotary shaft 30. The length of the first antenna radiator 81 and the second antenna radiator 82 can be relatively long. The longer the antenna radiator 80, the lower the frequency of the emitted and received radio frequency signals can be, and the wider the reception range of antenna can be. The first antenna radiator 81 and the second antenna radiator 82 can be configured to emit and receive radio frequency signals at low frequencies as well as at high frequencies to operate in a wide frequency band, and the whole antennas of the electronic device 100 is more convenient to arrange.

Figure 9:
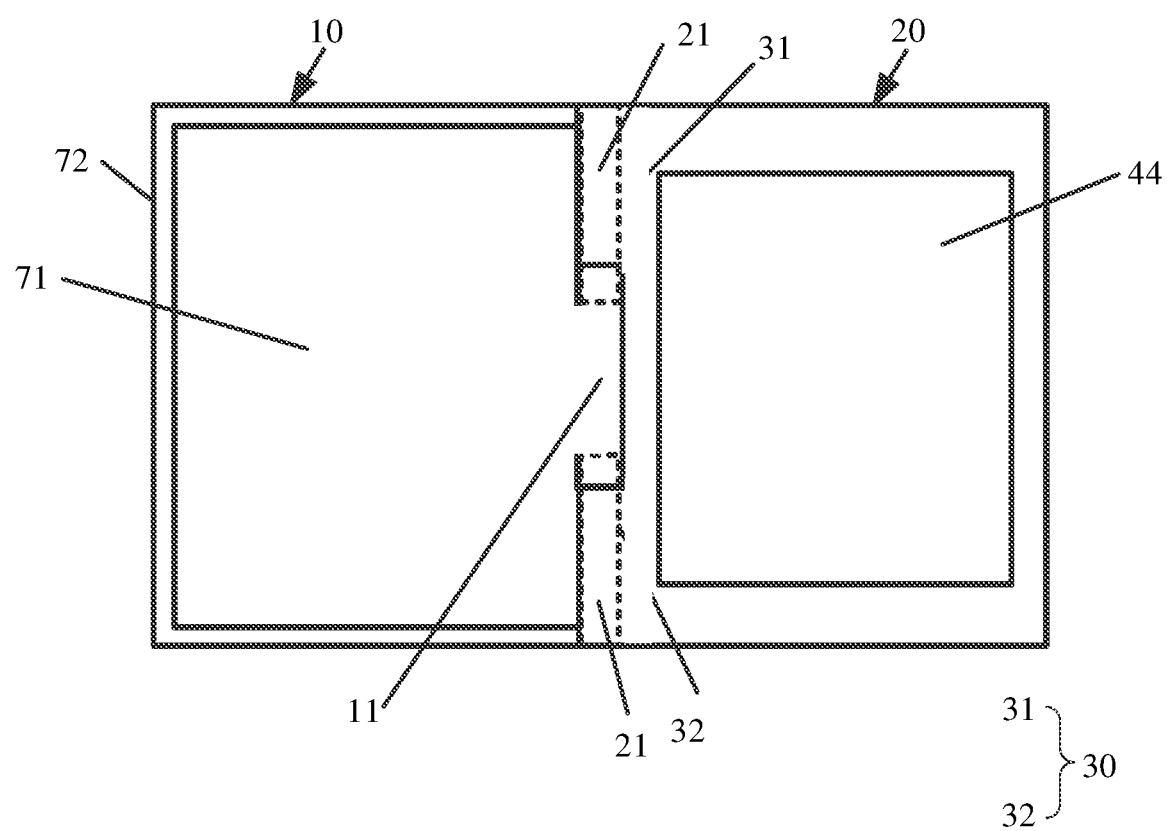
FIG. 9 is an eighth schematic view of an electronic device according to an embodiment of the present disclosure.

In some embodiments, FIG. 9 illustrates that the first housing 10 includes a first connecting portion 11. The first connecting portion 11 is coupled to the rotary shaft 30. The second housing 20 includes a second connecting portion 21, and the second connecting portion 21 is coupled to the rotary shaft 30. The first connecting portion 11 and the second connecting portion 21 are positioned between the first end 331 and the second end 332.

The first connecting portion 11 and the second connecting portion 21 can be sheathed outside the rotary shaft 30 or embedded in the rotary shaft 30. A detent mechanism can be positioned on the rotary shaft 30. The detent mechanism can hold the first connecting portion 11 and the second connecting portion 21 at a preset angle, so that the first shell 10 and the second shell 20 can form a variety of angles, including but not limited to folded and/or unfolded angles. In at least one embodiment, the first connecting portion 11 and the second connecting portion 21 and the detent mechanism can be replaced by a damping hinge mechanism.

The rotary shaft 30 may include the first shaft portion 31 and the second shaft portion 32. The first shaft portion 31 is separated from the second shaft portion 32. The first connecting portion 11 is positioned between the first shaft portion 31 and the second shaft portion 32. Two ends of the first connecting portion 11 are respectively sheathed outside the first shaft portion 31 and the second shaft portion 32. Two ends of the second connecting portion 21 are respectively sheathed outside the first shaft portion 31 and the second shaft portion 32, and the second connecting portion 21 is positioned between two ends of the rotary shaft 30 and the first connecting portion 11.

Figure 10:
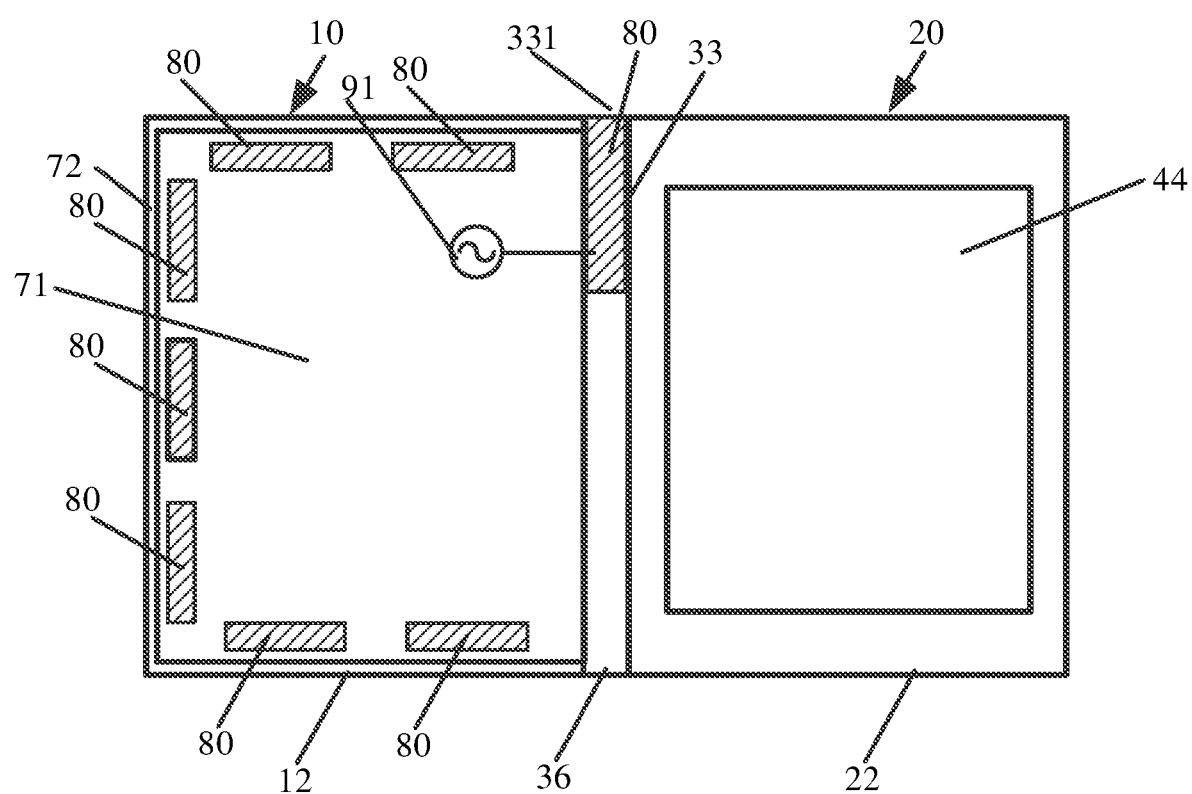
FIG. 10 is a ninth schematic view of an electronic device according to an embodiment of the present disclosure.

In some embodiments, FIG. 10 illustrates that the rotary shaft 30 includes a rotary shaft housing 36. The rotary shaft housing 36 is provided with the at least one antenna radiator 80 that is positioned inside the rotary shaft housing 36. The rotary shaft housing 36 can be made of non-metallic material.

In some embodiments, the rotary shaft 30 includes a rotary shaft housing 36. The rotary shaft housing 36 is configured to connect with the first housing 10 and the second housing 20. The rotary shaft housing 36 can be made of non-metallic material. The antenna radiator 80 is positioned inside the rotary shaft housing 36. The non-metallic materials of the rotary shaft do not interfere with the emitting and receiving radio frequency signals of the antenna radiator 80, thereby allowing different types of antenna radiator 80 to be set up according to actual needs.

With reference to FIG. 10, in some embodiments, the first housing 10 includes a first housing assembly 12, and the second housing 20 includes a second housing assembly 22. The first housing assembly 12 can be coupled to the second housing assembly 22 by the rotary shaft housing 36.

The first housing assembly 12 can be coupled to the second housing assembly 22 by the rotary shaft housing 36. The rotary shaft housing 36 is not enclosed by the first housing assembly 12 and the second housing assembly 22. That is, the radio frequency signals emitted by the antenna radiator 80 can be transmitted to the outside without passing through the first housing assembly 12 or the second housing assembly 22. The radio frequency signals exit through the rotary shaft housing 36, thereby achieving better antenna performance of the antenna radiator 80. The first housing assembly 12 and the second housing assembly 22, which are coupled to or adjacent to the rotary shaft housing 36, can be made of metal materials and do not affect the antenna performance of the antenna radiator 80.

In some embodiments, the antenna radiator 80 on the rotary shaft 30 is configured to transmit the radio frequency signals at a first frequency or a second frequency. The first frequency is below 4200 MHz, and the second frequency is above 4.4 Ghz.

The antenna radiator 80 on the rotary shaft 30 can be configured to emit and receive 4G or 5G radio frequency signals. The first frequency can range from 615 MHz to 4200 MHz. The second frequency can range from 4.4 GHz to 30 GHz.

With reference to FIG. 10, in some embodiments, there are a number of additional antenna radiators 80 positioned on the first housing 10. The number of additional antenna radiators 80 positioned on the first housing 10 and the antenna radiators 80 positioned on the rotary shaft 30 is 8, 12 or 16.

The number of the additional antenna radiators 80 positioned on the first housing 10 and the antenna radiators 80 positioned on the rotary shaft 30 is 8, 12 or 16. That is, 8, 12 or 16 antenna radiators 80 are set on the electronic equipment. These antenna radiators 80 can form the multiple-input multiple-output (MIMO) antenna, in which multiple antenna radiators can simultaneously emit or receive radio frequency signals. The MIMO antenna can be configured to emit and receive 5G radio frequency signals. It is to be noted that the antenna radiators 80 of the MIMO antenna are spaced apart from each other. The specification parameters (such as length, width, material, etc.) of each antenna component of MIMO antenna can be the same or different.

In some embodiments, the electronic device 100 further includes a first signal source 91. The first signal source 91 is electrically coupled with the antenna radiator 80. The first signal source 31 is positioned inside the first housing 10.

There are a number of the additional antenna radiators 80 positioned on the first housing 10. The circuit board 50 is positioned inside the first housing 10, and the first signal source 91 electrically coupled with the antenna radiator 80 is also positioned inside the first housing 10. The first signal source 91 can be positioned on the circuit board 50 or on another small circuit board, which is electrically coupled to the circuit board 50.

In some embodiments, the first housing 10 includes the first housing assembly 12. The first housing assembly 12 includes the rear cover 71. The rear cover 71 and the display screen 40 are respectively disposed on opposite sides of the first housing 10.

The circuit board 50 and the battery 60 can be positioned on the first housing 10 to facilitate the electrical connection between the antenna radiator 80 and the circuit board 50.

In some embodiments, the rear cover 71 is made of non-metallic material. A number of the additional antenna radiators 80 are positioned on the rear cover 71. The additional antenna radiators 80 are positioned on the rear cover 71 for convenient setting, and the radio frequency signals transmitted by the additional antenna radiators 80 can pass through the rear cover 71 made of non-metallic materials.

In some embodiments, the first housing assembly 12 includes the middle frame 72. A number of the additional antenna radiators 80 are positioned on the middle frame 72.

The middle frame 72 is disposed around the display screen 40. The additional antenna radiators 80 on the first housing 10 are positioned on the middle frame 72, so that radio frequency signals can be easily transmitted to the outside. It is also convenient for the electronic device 100 to receive radio frequency signals from the outside. The rear cover 71 can be made of metal material to improve the strength and tactile sensation of the rear cover 71.

It is to be noted that the antenna radiator 80 on the rotary shaft 30 and the antenna radiators 80 on the first housing 10 can be the same antenna radiator.

In some embodiments, the second housing 20 further includes the secondary display screen 44. The secondary display screen 44 and the display screen 40 are respectively disposed on opposite sides of the second housing 20. The antenna radiators of the electronic device 100 are positioned on the rotary shaft 30 and the first housing 10. The rotary shaft 30 and the first housing 100 can facilitate the arrangement of the antenna radiators and reduce the influence of the secondary display screen 44 on the antenna radiators. Display screens are positioned on both sides of the second housing 20. When the display screen 40 is folded, users can continue using the electronic device 100 by the secondary display screen 44, thus protecting the display screen 40 and reducing power consumption.

It is to be noted that the antenna radiator in this present disclosure can be understood as an antenna radiator and equivalent circuitry.

In an embodiment of the present disclosure, a number of the antenna radiators 80 positioned on the rotary shaft 30 can form the MIMO antenna. The rotary shaft 30 can improve the stability of the electronic device 100 when communicating with base stations or other electronic equipment.

Figure 11:
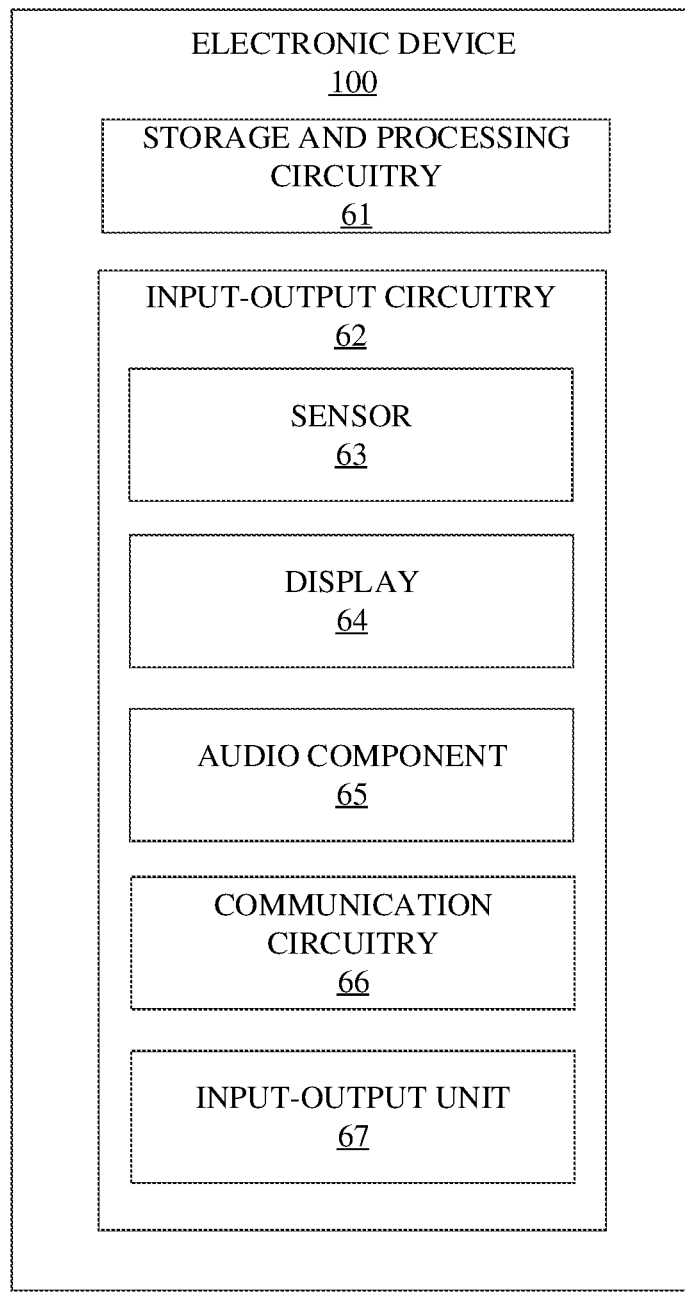
FIG. 11 is a module block diagram of an electronic device according to an embodiment of the present disclosure.

FIG. 11 illustrates that the electronic device 100 may include storage and processing circuitry 61. Storage and processing circuitry 61 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 61 may be used to control the operation of electronic device 100. This processing circuitry may be based on one or more microprocessors, microcontrollers, digital signal processors, applications specific integrated circuits, etc.

Storage and processing circuitry 61 may be used to run software on the electronic device 100, such as internet browsing applications, voice-over-internet-protocol (VOIP) telephone call applications, email applications, media playback applications, operating system functions, etc. The software may be used to implement control operations such as image acquisition operations using a camera, ambient light measurements using an ambient light sensors, proximity sensor measurements using a proximity sensor, information display functions implemented using status indicators such as light-emitting-diode status indicators, touch event measurements using a touch sensor, functions associated with displaying information on multiple (e.g., layered) displays, operations associated with performing wireless communications functions, operations associated with gathering and producing audio signals, operations associated with gathering and processing button press event data, strain gauge data collection and processing functions, operations associated with responding to strain gauge information, and other functions in the electronic device 100. The specification shall not be construed as limitations to the present invention.

The electronic device 100 may include an input-output circuitry 62. Input-output circuitry 62 may be used to allow data to be supplied to the electronic device 100 and to allow data to be provided from the electronic device 100 to external devices. Input-output circuitry 62 may include sensors 63 such as ambient light sensors, light-based and capacitive proximity sensors, touch sensors (e.g., light-based touch sensors and/or capacitive touch sensors that are part of a touch screen display or that are implemented using stand-alone touch sensor structures), accelerometers, and other sensors.

Input-output circuitry 62 may also include one or more displays such as display 64. Display 64 may be a liquid crystal display, an organic light-emitting diode display, an electronic ink display, a plasma display, a display that uses other display technologies, or a display that uses any two or more of these display configurations. Display 64 may include an array of touch sensors (i.e., display 64 may be a touch screen). The touch sensors may be capacitive touch sensors formed from an array of transparent touch sensor electrodes such as indium tin oxide (ITO) electrodes or may be touch sensors formed using other touch technologies, e.g., acoustic touch, pressure-sensitive touch, resistive touch, optical touch, etc. The specification shall not be construed as limitations to the present invention.

The electronic device 100 may also include an audio component 65. Audio components 65 may be used to provide the electronic device 100 with audio input and output capabilities. Examples of audio components that may be included in the electronic device 100 include speakers, microphones, buzzers, tone generators, and other components for producing and detecting sound.

Communications circuitry 66 may be used to provide the electronic device 100 with the ability to communicate with external equipment. Communications circuitry 66 may include analog and digital input-output port circuitry and wireless circuitry based on radio-frequency signals and/or light. Wireless circuitry in communications circuitry 66 may include radio-frequency transceiver circuitry, power amplifier circuitry, low-noise amplifiers, switches, filters, and antennas. Wireless communications circuitry in communications circuitry 66 may, for example, include circuitry for supporting near field communications (NFC) by transmitting and receiving near-field-coupled electromagnetic signals. For example, communications circuitry 66 may include a near field communications antenna and a near field communications transceiver. Communications circuitry 66 may also include a cellular telephone transceiver and antennas, wireless local area network transceiver circuitry and antennas, etc.

The electronic device 100 further includes a battery 60, a power management circuit and input-output unit 67. Input-output unit 67 may include communications circuitry for supporting wired and wireless communications, buttons, joysticks, click wheels, scrolling wheels, touch pads, key pads, keyboards, cameras, light-emitting diodes and other status indicators, etc.

User can control the electronic device 100 by inputting commands on input-output circuitry 62, and input-output circuitry 62 can be configured to receive state information and other outputs from electronic device 100.

In the above embodiments, the descriptions of the embodiments place different emphasis on different aspects, and for a part that is not detailed in an embodiment, reference can be made to the relevant descriptions of other embodiments.

In the specification, it is to be understood that terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention. "a plurality of" means two or more than two, unless specified otherwise.

An antenna mechanism and electronic device provided by the present invention are introduced in detail above, the principle and implementation of the present invention are described herein through specific embodiments, and the description of the embodiments are merely intended to make the method and core idea of the present invention comprehensible. Person having ordinary skill in the art can make variations and modifications to the present invention in terms of the specific implementations and application scopes according to the ideas of the present invention. Therefore, the specification shall not be construed as limitations to the present invention.

What is claimed is:

1. An electronic device, comprising:
   a first housing;
   a second housing;
   a rotary shaft separating from the first housing and the second housing, wherein the second housing is rotatably coupled to the first housing by the rotary shaft;
   a single-piece flexible display screen that comprises a first portion positioned on the first housing, and a second portion positioned on the second housing; and
   at least one antenna radiator positioned on the rotary shaft, wherein the at least one antenna radiator, the first housing, and the second housing are arranged to transmit radio frequency signals outward without affecting components of the first housing, the second housing and the display screen.

2. The electronic device according to claim 1, wherein the at least one antenna radiator comprises:
a first antenna radiator positioned on the rotary shaft; and
a second antenna radiator positioned on the rotary shaft and separated from the first antenna radiator.

3. The electronic device according to claim 2, wherein the rotary shaft comprises a first shaft portion and a second shaft portion separated from the first shaft portion, wherein the first antenna radiator is positioned on the first shaft portion and wherein the second antenna radiator is positioned on the second shaft portion.

4. The electronic device according to claim 1, wherein the rotary shaft comprises a first end, and wherein the at least one antenna radiator is positioned near the first end of the rotary shaft, the at least one antenna radiator extending to the first end of the rotary shaft.

5. The electronic device according to claim 1, wherein the rotary shaft is a metal shaft, the rotary shaft comprising a first end and a second end opposite to the first end, and wherein a ground point is positioned on the rotary shaft and positioned between the first end and the second end so that a first part of the rotary shaft between the first end and the ground point forms a first antenna radiator of the at least one antenna radiators and a second part of the rotary shaft between the second end and the ground point forms a second antenna radiator of the at least one antenna radiators.

6. The electronic device according to claim 5, wherein the first housing comprises a first connecting portion coupled to the rotary shaft, and wherein the second housing comprises a second connecting portion coupled to the rotary shaft, the first connecting portion and the second connecting portion positioned between the first end and the second end.

7. The electronic device according to claim 1, wherein the rotary shaft comprises a non-metallic rotary shaft housing, and wherein the at least one antenna radiator is positioned inside the non-metallic rotary shaft housing.

8. The electronic device according to claim 1, wherein the first housing comprises a first housing assembly, and wherein the second housing comprises a second housing assembly that is coupled to the first housing assembly by the rotary shaft housing.

9. The electronic device according to claim 1, wherein the at least one antenna radiator on the rotary shaft is configured to transmit radio frequency signals at a first frequency that is below 4200 MHz, or a second frequency that is above 4.4 GHz.

10. The electronic device according to claim 1 further comprising a plurality of additional antenna radiators, wherein the additional antenna radiators are positioned on the first housing, wherein a number of the additional antenna radiators positioned on the first housing and the antenna radiators positioned on the rotary shaft is 8, 12 or 16.

11. The electronic device according to claim 1, further comprising:
a first signal source positioned inside the first housing to be electrically coupled to the at least one antenna radiator.

12. The electronic device according to claim 1, further comprising:
a housing assembly that comprises a rear cover, wherein the rear cover and a portion of the display screen are respectively disposed on opposite sides of the first housing.

13. The electronic device according to claim 12 further comprising a plurality of additional antenna radiators, wherein the rear cover comprises a non-metallic material, and wherein the additional antenna radiators are positioned on the rear cover.

14. The electronic device according to claim 12 further comprising a plurality of additional antenna radiators, wherein the first housing assembly comprises a middle frame, and wherein the additional antenna radiators are positioned on the middle frame.

15. The electronic device according to claim 1, further comprising a secondary display screen, wherein the secondary display screen and the display screen are respectively disposed on opposite sides of the second housing, and wherein the display screen is flexible.

16. An electronic device, comprising:
a first housing;
a second housing;
a rotary shaft separating from the first housing and the second housing, wherein the first housing is coupled to the second housing by the rotary shaft; and
at least one antenna radiator positioned on the rotary shaft, wherein the antenna radiator, the first housing, and the second housing are arranged to transmit radio frequency signals outward through the rotary shaft and without affecting components of the first housing, the second housing.

17. The electronic device according to claim 16, wherein the rotary shaft is exposed externally when the first housing and the second housing are folded relative to each other, and wherein the radio frequency signals emitted by the antenna radiator are transmitted through the rotary shaft.

18. The electronic device according to claim 16, further comprising:
a flexible display screen positioned on the first housing and the second housing.

19. The electronic device according to claim 18, wherein the flexible display screen is configured to fold inward when the first housing and the second housing are folded relative to each other.

* * * * *